(12) United States Patent
Wang et al.

(10) Patent No.: US 9,155,084 B2
(45) Date of Patent: Oct. 6, 2015

(54) METHODS AND DEVICES FOR TRANSMITTING DATA

(71) Applicant: Huawei Technologies Co., Ltd., Shenzhen, Guangdong (CN)

(72) Inventors: Li Wang, Shenzhen (CN); Bin Zhen, Shenzhen (CN); Meng Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 134 days.

(21) Appl. No.: 14/080,207

(22) Filed: Nov. 14, 2013

(65) Prior Publication Data
US 2014/0092880 A1    Apr. 3, 2014

Related U.S. Application Data

(63) Continuation of application No. PCT/CN2012/074373, filed on Apr. 19, 2012.

(30) Foreign Application Priority Data

May 31, 2011    (CN) .......................... 2011 1 0144690

(51) Int. Cl.
*H04W 72/04*    (2009.01)
*H04L 5/00*    (2006.01)
(Continued)

(52) U.S. Cl.
CPC .......... *H04W 72/0413* (2013.01); *H04L 5/0007* (2013.01); *H04L 5/0035* (2013.01);
(Continued)

(58) Field of Classification Search
CPC ... H04L 5/0035; H04L 5/0048; H04L 5/0053; H04W 72/042; H04W 72/0446
See application file for complete search history.

(56) References Cited

U.S. PATENT DOCUMENTS 8,537,729 B2 * 9/2013 Hao et al. ...................... 370/294
2010/0227606 A1 * 9/2010 Nan et al. ................... 455/422.1
(Continued)

FOREIGN PATENT DOCUMENTS

CN    1909691 A    2/2007
CN    101394648 A    3/2009
(Continued)

OTHER PUBLICATIONS

"3GPP TS 36.300—$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," Version 10.3.0, $3^{rd}$ Generation Partnership Project, Valbonne, France (Mar. 2011).
(Continued)

*Primary Examiner* — Raj Jain
(74) *Attorney, Agent, or Firm* — Leydig, Voit & Mayer, Ltd.

(57) ABSTRACT

Embodiments of the present disclosure provide a method and a device for transmitting data. The method includes: a user equipment receives downlink data sent from a base station through downlink resources of a special subframe; the user equipment determines its corresponding guard period level, the guard period level corresponds to a round-trip time of the user equipment and indicates a length of an orthogonal frequency division multiplexing (OFDM) symbol in a guard period corresponding to the user equipment in the special subframe; the user equipment determines, according to its corresponding guard period level, a position of uplink resources corresponding to the user equipment in guard period resources of the special subframe; and the user equipment sends uplink data to the base station through the uplink resources corresponding to the user equipment in the guard period resources of the special subframe.

32 Claims, 6 Drawing Sheets

---

201, The base station sends, to a UE, downlink data through downlink resources of a special subframe 202, The base station determines a guard period level corresponding to the UE, wherein the guard period level corresponds to a round-trip time of the UE and indicates a length of an OFDM symbol in a guard period corresponding to the UE in the special subframe 203, The base station determines a location of uplink resources corresponding to the UE in the GP resources of the special subframe, according to the guard period level corresponding to the UE 204, The base station receives uplink data, sent by the UE through the uplink resources corresponding to the UE in the GP resources of the special subframe

(51) Int. Cl.
*H04L 27/26* (2006.01)
*H04W 56/00* (2009.01)

(52) U.S. Cl.
CPC ............ *H04L5/0037* (2013.01); *H04L 5/0048* (2013.01); *H04L 5/0094* (2013.01); *H04L 27/2605* (2013.01); *H04W 56/00* (2013.01); *H04W 72/042* (2013.01); *H04L 5/0069* (2013.01); *H04L 5/0085* (2013.01)

(56) References Cited

U.S. PATENT DOCUMENTS

| | | | |
|---|---|---|---|
| 2010/0238847 A1 | 9/2010 | Suo et al. | |
| 2011/0237270 A1* | 9/2011 | Noh et al. | 455/450 |
| 2011/0299614 A1* | 12/2011 | Kim et al. | 375/260 |
| 2012/0069790 A1* | 3/2012 | Chung et al. | 370/315 |
| 2012/0099532 A1 | 4/2012 | Lee et al. | |
| 2013/0028221 A1* | 1/2013 | Seo et al. | 370/329 |
| 2013/0077660 A1* | 3/2013 | Ko et al. | 375/219 |
| 2013/0258938 A1* | 10/2013 | Sagfors et al. | 370/312 |
| 2014/0071921 A1* | 3/2014 | Wang et al. | 370/329 |

FOREIGN PATENT DOCUMENTS

| | | |
|---|---|---|
| CN | 101425844 A | 5/2009 |
| CN | 101682397 A | 3/2010 |
| CN | 101809896 A | 8/2010 |
| CN | 101997600 A | 3/2011 |
| CN | 102137500 A | 7/2011 |
| WO | WO 2008088252 A1 | 6/2008 |

OTHER PUBLICATIONS

"Way forward on Special sub-frame patterns for FS2," TSG-RAN WG1 #51bis, Seville, Spain, R1-080602, 3$^{rd}$ Generation Partnership Project, Valbonne, France (Jan. 14-18, 2008).

* cited by examiner

METHODS AND DEVICES FOR TRANSMITTING DATA

CROSS-REFERENCE TO RELATED APPLICATIONS

This application is a continuation of International Patent Application No. PCT/CN2012/074373, filed on Apr. 19, 2012, which claims priority to Chinese Patent Application No. 201110144690.4, filed on May 31, 2011, both of which are hereby incorporated by reference in their entireties.

TECHNICAL FIELD

The present disclosure relates to the technical field of communications, and more particularly, to methods and devices for transmitting data.

BACKGROUND

In a time division duplexing TDD (Time Division Duplexing) wireless communication system of a long term evolution LTE (Long Term Evolution)/an enhanced long term evolution LTE-A (LTE Advanced), each radio frame includes 10 subframes, and each subframe can be a downlink subframe, an uplink subframe or a special subframe depending on service usage of the subframe. Among them, the special subframe consists of three special time slots, i.e., a downlink pilot time slot DwPTS (Downlink Pilot Time Slot), a guard period GP (Guard Period), and an uplink pilot time slot UpPTS (Uplink Pilot Time Slot).

The DwPTS of a frame structure in an LTE TDD system can be configured with 3 to 12 orthogonal frequency division multiplexing (OFDM) (Orthogonal Frequency Division Multiplexing) symbols in length, used for downlink transmission. The UpPTS can be configured with 1 to 2 OFDM symbols in length, used for uplink transmission. The GP is a guard interval between the uplink transmission and the downlink transmission, mainly consisting of a "round-trip time RTT (Round-trip Time)" and a "device transceiver conversion time delay". The device transceiver conversion time delay generally does not exceed a length of one OFDM symbol, and an RTT corresponding to a coverage radius of a cell mainly affects a GP length.

In the prior art, the GP length should be greater than or equal to a sum of a maximum RTT of the cell and the device transceiver conversion time delay, so that normal handover between downlink and uplink signals can be performed by a user at the edge of the cell. The GP resources occupy a lot of system resources, and a cell with a larger radius needs to configure with a larger GP. A user equipment (UE, User Equipment) close to a base station, upon receiving downlink data of the base station, sends uplink data only after waiting for a period of time due to a small RTT thereof, and therefore, the system resources cannot be effectively utilized.

SUMMARY

Various aspects of the present disclosure provide a method and a device for transmitting data, so as to effectively improve resource utilization of a system.

One aspect of the present disclosure provides a method for transmitting data, including: a UE receiving downlink data sent from a base station through downlink resources of a special subframe; the UE determining a guard period level corresponding to the user equipment, the guard period level corresponds to a round-trip time of the UE and indicates a length of an OFDM symbol in a guard period corresponding to the UE in the special subframe; the UE determining, according to the guard period level corresponding to the user equipment, a position of uplink resources corresponding to the UE in guard period resources of the special subframe; and the UE sending uplink data to the base station through the uplink resources corresponding to the UE in the guard period resources of the special subframe.

Another aspect of the present disclosure further provides a method for transmitting data, including: a base station sending downlink data to a UE through downlink resources of a special subframe; the base station determining a guard period level corresponding to the UE, the guard period level corresponds to a round-trip time of the UE and indicates a length of an OFDM symbol in a guard period corresponding to the UE in the special subframe; the base station determining, according to the guard period level corresponding to the UE, a position of uplink resources corresponding to the UE in guard period resources of the special subframe; and the base station receiving uplink data sent from the UE through the uplink resources corresponding to the UE in the guard period resources of the special subframe.

Another aspect of the present disclosure further provides a UE, including: a receiving unit, configured to receive downlink data sent from a base station through downlink resources of a special subframe; a determining unit, configured to determine a guard period level corresponding to the UE and determine a position of uplink resources corresponding to the UE in guard period resources of the special subframe, according to the guard period level corresponding to the UE, wherein the guard period level corresponds to a round-trip time of the UE and indicates a length of an orthogonal frequency division multiplexing (OFDM) symbol in a guard period corresponding to the UE in the special subframe; and a sending unit, configured to send uplink data to the base station through the uplink resources corresponding to the UE in the guard period resources of the special subframe.

Another aspect of the present disclosure further provides a base station, including: a sending unit, configured to send, to a UE, downlink data through downlink resources of a special subframe; a determining unit, configured to determine a guard period level corresponding to the UE and determine a position of uplink resources corresponding to the UE in guard period resources of the special subframe, according to the guard period level corresponding to the UE, wherein the guard period level corresponds to a round-trip time of the UE and indicates a length of an OFDM symbol in a guard period corresponding to the UE in the special subframe; and a receiving unit, configured to receive uplink data sent from the UE through the uplink resources corresponding to the UE in the guard period resources of the special subframe.

The above technical solutions can effectively improve resource utilization of the system.

Another aspect of the present disclosure further provides a method for transmitting data, including: a base station determining a guard period level corresponding to a UE, the guard period level corresponds to a round-trip time of the UE and indicates a length of an OFDM symbol in a guard period corresponding to the UE in the special subframe; the base station determining, according to the guard period level corresponding to the UE, a location of downlink resources corresponding to the UE in guard period resources of the special subframe; and the base station sending downlink data to the UE through the downlink resources corresponding to the UE in the guard period resources of the special subframe.

Another aspect of the present disclosure further provides a method for transmitting data, including: a UE determining a guard period level corresponding to the UE, the guard period level corresponds to a round-trip time of the UE and indicates a length of an OFDM symbol in a guard period corresponding to the UE in a special subframe; the UE determining, according to the guard period level corresponding to the UE, a location of downlink resources corresponding to the UE in guard period resources of the special subframe; and the UE receiving downlink data sent from the base station through the downlink resources corresponding to the UE in the guard period resources of the special subframe.

Another aspect of the present disclosure further provides a base station, including: a determining unit, configured to determine a guard period level corresponding to a UE and determine a location of downlink resources corresponding to the UE in guard period resources of a special subframe, according to the guard period level corresponding to the UE, wherein the guard period level corresponds to a round-trip time of the UE and indicates a length of an OFDM symbol in a guard period corresponding to the UE in the special subframe; and a sending unit, configured to send, to the UE, downlink data through the downlink resources corresponding to the UE in the guard period resources of the special subframe.

Another aspect of the present disclosure further provides a UE, including: a determining unit, configured to determine a guard period level corresponding to the UE and determine a location of downlink resources corresponding to the UE in guard period resources of a special subframe, according to the guard period level corresponding to the UE, wherein the guard period level corresponds to a round-trip time of the UE and indicates a length of an OFDM symbol in a guard period corresponding to the UE in the special subframe; and a receiving unit, configured to receive downlink data sent from the base station through the downlink resources corresponding to the UE in the guard period resources of the special subframe.

The above technical solutions can effectively improve resource utilization of the system.

BRIEF DESCRIPTION OF DRAWINGS

In order to illustrate the technical solutions of embodiments of the present disclosure or the prior art more clearly, accompanying drawings needed in the embodiments or the prior art are illustrated briefly in the following. Apparently, the accompanying drawings show certain embodiments of the present disclosure, and persons skilled in the art can derive other drawings from them without creative efforts.

DESCRIPTION OF EMBODIMENTS

Figure 1:
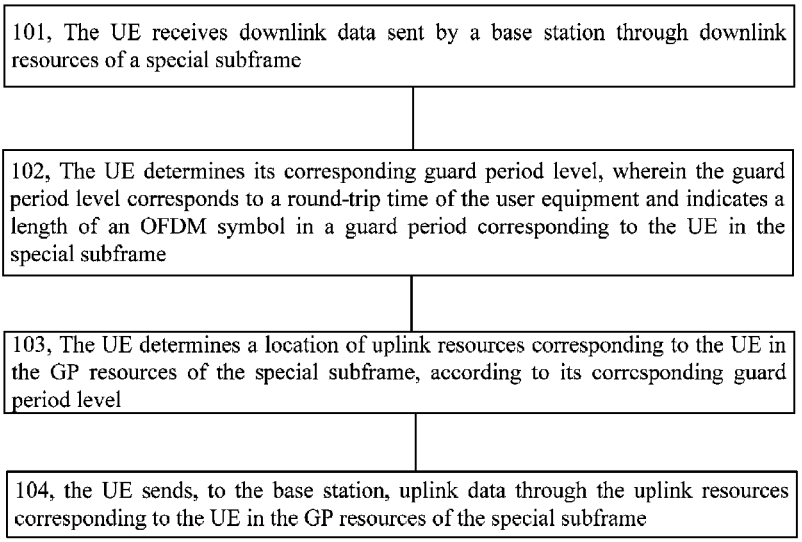
FIG. 1 is a flow chart of a method for transmitting data according to an embodiment of the present disclosure.

The technical solutions in embodiments of the present disclosure are hereinafter described clearly and completely with reference to the accompanying drawings in the embodiments of the present disclosure.

Apparently, the embodiments described herein are only a part of the embodiments of the present disclosure, rather than all the embodiments of the present disclosure. All other embodiments, which can be derived by persons skilled in the art from the embodiments given herein without creative efforts, shall fall within the protection scope of the present disclosure.

The techniques described herein can be used for various wireless communication systems such as the current 2G and 3G communication systems and the next generation communication system, such as a global system for mobile communication (GSM, Global System for Mobile communications), a code division multiple access (CDMA, Code Division Multiple Access) system, a time division multiple access (TDMA, Time Division Multiple Access) system, a wideband code division multiple access (WCDMA, Wideband Code Division Multiple Access Wireless), a frequency division multiple addressing (FDMA, Frequency Division Multiple Addressing) system, an orthogonal frequency-division multiple access (OFDMA, Orthogonal Frequency-Division Multiple Access) system, a single carrier FDMA (SC-FDMA) system, a general packet radio service (GPRS, General Packet Radio Service) system, a long term evolution (LTE, Long Term Evolution) system, and other communication systems, and can be particularly suitable for a TDD system under the above systems.

Various aspects are described herein in connection with a terminal (i.e., UE) and/or a base station and/or a base station controller.

The terminal can be a wired terminal or a wireless terminal, and the wireless terminal may refer to a device providing voice and/or data connectivity to a user, a handheld device having wireless connection function, or other processing device connected to a wireless modem. The wireless terminal can communicate with one or more core networks via a radio access network (such as, RAN, Radio Access Network), and the wireless terminal can be a mobile terminal, such as a mobile phone (or a "cellular" phone) and a computer with a mobile terminal, and thus can be, for example, portable, pocket, hand-held, built-in computer, or car-mounted mobile devices which communicate voice and/or data with the radio access network. For example, a personal communication service (PCS, Personal Communication Service) phone, a cordless phone, a session initiation protocol (SIP) phone, a wireless local loop (WLL, Wireless Local Loop) station, a personal digital assistant (PDA, Personal Digital Assistant) and other devices. The wireless terminal also can be referred to as a system, a subscriber unit (Subscriber Unit), a subscriber station (Subscriber Station), a mobile station (Mobile Station), a mobile (Mobile), a remote station (Remote Station), an access point (Access Point), a remote terminal (Remote Terminal), an access terminal (Access Terminal), a user terminal (User Terminal), a user agent (User Agent), a user device (User Device), or a user equipment (User Equipment).

The base station (such as, access point) can refer to a device in an access network that communicates over an air-interface, through one or more sectors, with wireless terminals. The base station can act as a router between the wireless terminal and the rest of the access network by performing a conversion between the received air-interface frames and IP packets, wherein the rest of the access network can include an Internet Protocol (IP) network. The base station also coordinates management of attributes for the air interface. For example, the base station can be a base station (BTS, Base Transceiver Station) in GSM or CDMA, or a base station (NodeB) in WCDMA, or an evolved Node B (NodeB or eNB or e-NodeB, evolutional Node B) in LTE, and the present disclosure is not limited thereto.

The base station controller can be a base station controller (BSC, base station controller) in GSM or CDMA, or a radio network controller (RNC, Radio Network Controller) in WCDMA, and the present disclosure is not limited thereto.

Furthermore, the term "system" and "network" may be used interchangeably herein. The term "and/or" herein is merely to describe association relationship between associated objects, and indicates there may be three types of relationship, for example, A and/or B can indicate three cases, that is, A exists individually, A exists together with B, and B exists individually. Furthermore, the character "/" generally indicates that the before and after associated objects are in an alternative relationship.

As described above in the background, the special subframe of the frame structure in the LTE TDD system is composed of three special time slots in sequence, that is, DwPTS, GP and UpPTS, in the case of transmitting data through a special subframe, the DwPTS is used for transmitting downlink data, the UpPTS is used for transmitting uplink data, the GP is a time interval between the downlink data transmission and the uplink data transmission.

It should be noted that, in a frame structure of a cell provided by embodiments of the present disclosure, the length of GP resources in the special subframe should be greater than or equal to a sum of a maximum RTT of a cell and a device transceiver conversion time delay, so that normal handover between downlink and uplink signals can be performed by a user at the edge of the cell.

In such a scenario that the GP resources in the special subframe are used for transmitting uplink data, as shown in FIG. 1, an embodiment of the present disclosure provides a method for transmitting data, based on a UE, including:

101, The UE receives downlink data sent from a base station through downlink resources of a special subframe.

The UE is located in a cell served by the base station.

102, The UE determines its corresponding guard period level, wherein the guard period level corresponds to a round-trip time of the user equipment and indicates a length of an OFDM symbol in a guard period corresponding to the UE in the special subframe.

Because there are a plurality of UEs in the cell served by the base station, and different UEs have different distances from the base station in the physical position, i.e., different RTTs, and therefore, when different UEs and the base station transmit data through a special subframe, the needed time intervals between the downlink transmission and the uplink transmission, i.e., the guard periods can be different from each other. However, fixed GP resources are set in the frame structure of the cell, that is, the time length of the GP resources is constant, and therefore, in the embodiment of the present disclosure, the GP resources in the special subframe can be used to send uplink data, which is equivalent to adjusting the time interval between the downlink transmission and the uplink transmission of the UE.

It should be noted that, in all the embodiments of the present disclosure, the guard period corresponding to the UE refers to a time interval between the downlink transmission and the uplink transmission of the UE, while the GP refers to a guard period set in the frame structure of the cell, and the GP is greater than or equal to the guard period corresponding to the UE.

In the embodiment of the present disclosure, the guard period level of the UE is classified according to a round-trip time of each UE within a cell, so that different UEs can use guard periods with different lengths depending on different round-trip times, and the guard period level indicates the length of the OFDM symbol in the guard period corresponding to the UE in the special subframe.

Taking an LTE TDD system as an example, provided that a maximum coverage radius of a cell supported by the system is 107 km, and the length of the GP resources set in the frame structure of the cell is 10 OFDM symbols, the guard period level can be classified into five levels, i.e., level 1 to level 5, by taking two OMDM symbol lengths as a granularity, wherein level 1 corresponds to a guard period length of 2 OFDM symbols, level 2 corresponds to a guard period length of 4 OFDM symbols, and by such analogy. Different UEs in the cell correspond to the same or different guard period levels depending on different round-trip times thereof, for example, if the round-trip time of the UE1 is less than 2 OFDM symbols, the guard period level of the UE1 is level 1, and the guard period length is 2 OFDM symbols; and if the round-trip time of the UE2 is 3 OFDM symbols, the guard period level of the UE2 is level 2, and the guard period length is 4 OFDM symbols.

When data transmission between the UE1 and the base station is performed through the special subframe, according to the guard period level of the UE1, the first 2 OFDM symbols in GP resources will act as the guard period between the downlink data transmission and the uplink data transmission of the UE1, and the rest GP resources are used to send uplink data; likewise, in terms of UE2, when data transmission between the UE2 and the base station is performed through the special subframe, according to the guard period level of the UE2, the first 4 OFDM symbols in GP resources will act as the guard period between the downlink data transmission and the uplink data transmission of the UE2, and the rest GP resources are used to send uplink data.

It should be noted that, the classifying manner of the guard period level corresponding to the UE is not limited, for example, the guard period level can be classified by taking one or several OMDM symbol lengths as a granularity.

Of course, it can be understood that, in one embodiment of the present disclosure the guard period level corresponding to the UE is the length of the OFDM symbol in its corresponding guard period, and the UE determining its corresponding guard period level by the UE is equivalent to determining the length of the OFDM symbol in its corresponding guard period.

Optionally, the guard period level corresponding to the UE can be notified by the base station to the UE, or can be determined by the UE itself by computation.

For example, the base station can determine the guard period level corresponding to the UE, according to the corresponding RTT of the UE and the classifying manner of the guard period level which is preset or determined according to practical situations such as system delay requirements, and then send to the UE a notification regarding the guard period level of the UE by way of broadcasting or scheduling, where the notification carries an indication of guard period level corresponding to the UE, the UE receives the notification regarding the guard period level of the UE sent from the base station, and determines the guard period level corresponding to the UE according to the notification. For example, the base station can configure the UE by broadcasting a radio resource control (RRC, Radio Resource Control) message, namely notify the UE of the guard period level corresponding to the UE; the base station also can schedule the UE through a PDCCH (Physical Downlink Control Channel, physical downlink control channel) message so as to notify the UE of the guard period level corresponding to the UE.

In another embodiment of the present disclosure, the base station can directly notify the UE of the classifying manner of the guard period level, the UE receives a notification regarding the classifying manner of the guard period level sent from the base station, and determines by itself the guard period level corresponding to the UE, according to the classifying manner of the guard period level and the round-trip time of itself;

wherein, the classifying manner of the guard period level can include such as the length of GP resources in the cell and the granularity of the guard period level, i.e., a difference of the OFDM symbol lengths corresponding to adjacent guard period levels. The UE can determine the guard period level corresponding to the UE according to the classifying manner of the guard period level, i.e., determine the length of the OFDM symbol in the guard period corresponding to the UE.

In another embodiment of the present disclosure, the UE also can determine its corresponding GP level according to a preset value. For example, in terms of an immobile UE with a stationary location within a certain period, such as a smart meter (Smart Meter), and a feeder terminal unit FTU (Feeder Terminal Unit), the RTT during which it arrives at the base station has an incredibly small range of variation and can be considered to be constant, and therefore, a guard period level corresponding to each UE can be preset, or an RTT of each UE also can be stored in advance, so that each UE can determine, according to the stored RTT, the respective guard period level corresponding to each UE.

It should be noted that, the guard period level corresponding to the UE can directly indicate the length of the OFDM symbol in the guard period corresponding to the UE, also can indicate in a manner of level 1 or level 2, and the UE can pre-configure locally the length of the OFDM symbol in the guard period corresponding to the guard period level, and also can acquire the length of the OFDM symbol in the guard period corresponding to the guard period level by receiving the notification regarding the granularity of the guard period level from the base station.

It should be noted that, in embodiments of the present disclosure, the sequence of Step 101 and Step 102 is not limited, and Step 102 can be performed before or after Step 101.

103, The UE determines a position of uplink resources corresponding to the UE in the GP resources of the special subframe, according to its corresponding guard period level.

The UE determines its corresponding guard period level, i.e., determines the length of the OFDM symbol of its guard period, and then determines the position of the uplink resources corresponding to the UE in the GP resources of the special subframe. By way of example, if the guard period level of the UE1 is level 1, and the length of the guard period time is 2 OFDM symbols, the position of uplink resources corresponding to the UE1 in the GP resources of the special subframe starts from the third OFDM symbol in the GP resources.

Of course, it is well known that the location of resources includes a time location and a frequency location of resources, in this step, the UE can determine the time position of the uplink resources corresponding to the UE in the GP resources of the special subframe, according to its corresponding guard period level, and the UE can determine the frequency position of the uplink resources corresponding to the UE in the GP resources of the special subframe, by way of broadcasting or scheduling of the base station, such as the PDCCH (Physical Downlink Control Channel, physical downlink control channel) message issued by the base station, that is, in this step, the UE can determine the time location and frequency position of the uplink resources corresponding to the UE in the GP resources of the special subframe, according to its corresponding guard period level and the PDCCH issued by the base station. In addition, the UE also can determine the frequency position of the uplink resources corresponding to the UE in the GP resources of the special subframe, according to a preset value.

Taking a scenario that the UE initiates a random access as an example, before the UE initiates the random access, the base station notifies the UE of a frequency allocation manner of PRACH resources corresponding to different guard period levels, by way of broadcasting, where the frequency allocation manner of PRACH resources indicates the frequency location used by PRACH in the GP resources of the special subframe, after determining its guard period level, the UE determines the time location and the frequency location of the PRACH resources corresponding to the UE in the GP resources of the special subframe, according to its guard period level and the notification regarding the frequency allocation manner of PRACH resources from the base station, and then initiates the random access using the PRACH resources. It should be noted that, the frequency location of PRACH resources corresponds to the guard period level of the UE, and UE with different guard period levels has different frequency locations of PRACH resources.

In addition, the UE also can determine a frequency position of the uplink resources corresponding to the UE in the GP resources of the special subframe, according to a preset value.

104, the UE sends, to the base station, uplink data through the uplink resources corresponding to the UE in the GP resources of the special subframe.

The UE sends uplink data to the base station through the uplink resources corresponding to the UE in the GP resources of the special subframe, after determining the position of the uplink resources corresponding to the UE in the GP resources of the special subframe.

The uplink resources can be configured to be at least one of a physical random access channel (PRACH) (Physical Random Access Channel) message, a physical uplink shared channel (PUSCH) (Physical Uplink Shared Channel) message, a physical uplink control channel (PUCCH) (Physical Uplink Control Channel) message, and a sounding reference signal (SRS) (Sounding Reference Signal) message, that is, the UE can send messages such as PRACH, PUSCH, PUCCH and SRS to the base station through the uplink resources corresponding to the UE in the GP resources of the special subframe, of course the UE can send other messages, and the present disclosure is not limited thereto. The kind of uplink data sent from the UE through the uplink resources corresponding to the UE in the GP resources of the special subframe can be preset, or configured and notified by the base station to the UE, and the present disclosure is not limited thereto.

In the method for transmitting data provided by the embodiment of the present disclosure, the guard period level of the UE is classified, so that different UEs can use guard periods with different lengths depending on their different round-trip times, on one hand, waiting time of the uplink and downlink transmission of the UE adjacent to the base station is effectively reduced and transmission performance of the system is effectively improved; on the other hand, the UE can use GP resources to send uplink data, and therefore, available resources of the system are increased and the utilization rate of resources of the system is effectively improved.

Figure 2:
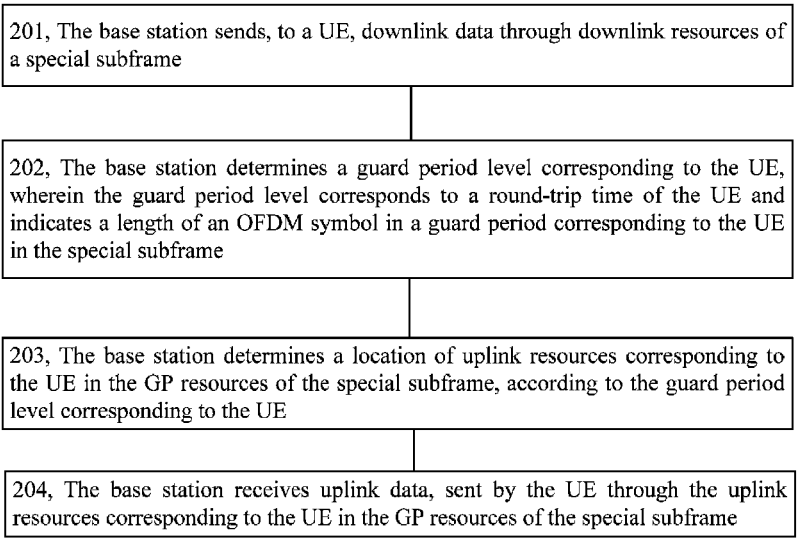
FIG. 2 is a flow chart of a method for transmitting data according to an embodiment of the present disclosure.

Corresponding to the method shown in FIG. 1, in such a scenario that the GP resources in the special subframe are used for transmitting uplink data, as shown in FIG. 2, an embodiment of the present disclosure also provides a method for transmitting data, based on a base station.

201, The base station sends, to a UE, downlink data through downlink resources of a special subframe.

202, The base station determines a guard period level corresponding to the UE, wherein the guard period level corresponds to a round-trip time of the UE and indicates a length of an OFDM symbol in a guard period corresponding to the UE in the special subframe.

In this step, optionally, the base station can acquire a round-trip time of the UE and determine the guard period level corresponding to the UE, according to the round-trip time of the UE; specifically, the base station can respectively acquire, according to an RTT of the UE in the previous data transmission, an RTT of the UE, and also can compute, according to a preamble sequence sent from the UE, an RTT of the UE, and also can compute, according to a broadcast timing message, an RTT of the UE, or can use other methods to acquire the RTT, and the present disclosure is not limited thereto.

The base station also can determine the guard period level of the UE, according to a preset value. For example, in terms of an immobile UE with a stationary location within a certain period, such as a smart meter (Smart Meter), and a feeder terminal unit FTU (Feeder Terminal Unit), the RTT during which it arrives at the base station has an incredibly small range of variation and can be considered to be constant, and therefore, the base station can preset a guard period level corresponding to each UE, or also can store in advance an RTT of each UE, so that the base station can determine, according to the stored RTT, the guard period level corresponding to the UE.

It should be noted that, in embodiments of the present disclosure, the sequence of Step 201 and Step 202 is not limited, and Step 202 can be performed before or after Step 201.

203, The base station determines a position of uplink resources corresponding to the UE in the GP resources of the special subframe, according to the guard period level corresponding to the UE;

The base station determines the length of the guard period corresponding to the UE after determining the guard period level corresponding to the UE, and then determines the position of the uplink resources corresponding to the UE in the GP resources of the special subframe. By way of example, if the guard period level of the UE1 is level 1, and the length of the guard period is 2 OFDM symbols, the position of uplink resources corresponding to the UE1 in the GP resources of the special subframe starts from the third OFDM symbol in the GP resources.

204, The base station receives uplink data sent from the UE through the uplink resources corresponding to the UE in the GP resources of the special subframe.

The received uplink data can be at least one of PRACH message, PUSCH message, PUCCH message and SRS message, of course, the received uplink data can be other messages, and the present disclosure is not limited thereto. The kind of uplink data sent from the UE through the uplink resources corresponding to the UE in the GP resources of the special subframe can be preset, or configured by the base station to the UE, in the latter case, the base station needs to notify the UE of the type of the configured uplink data, that is, the method for transmitting data provided by the embodiment of the present disclosure also includes:

The base station sends to the UE a notification of the kind of the uplink data sent from the UE through the uplink resources corresponding to the UE in the GP resources of the special subframe.

In the method for transmitting data provided by the embodiment of the present disclosure, the guard period level of the UE is classified, so that different UEs can use guard periods with different lengths depending on their different round-trip times, on one hand, waiting time of the uplink and downlink transmission of the UE adjacent to the base station is effectively reduced and transmission performance of the system is effectively improved; on the other hand, the UE can use GP resources to send uplink data, and therefore, available resources of the system are increased and the utilization rate of resources of the system is effectively improved.

In another embodiment of the present disclosure, the method for transmitting data of the present embodiment also includes the following contents:

The base station sends to the UE a notification regarding the guard period level of the UE. For example, after the radio resource control (RRC) is established, the base station sends to the UE indicator bit of guard period level corresponding to the UE, so that the UE determines its corresponding guard period level.

In another embodiment of the present disclosure, the method for transmitting data of the present embodiment also includes the following contents:

The base station sends to the UE a notification regarding a classifying manner of the guard period level, so that the UE can determine the guard period level corresponding to the UE, according to the classifying manner of the guard period level. In particular, the base station can notify the UE of the classifying manner of the guard period level through a system message.

In another embodiment of the present disclosure, the method for transmitting data of the present embodiment also includes the following contents:

The base station notifies the UE of the frequency position of the uplink resources corresponding to the UE in the GP resources of the special subframe by way of broadcasting or scheduling, so that the UE can determine the frequency position of the uplink resources corresponding to the UE in the GP resources of the special subframe, when the UE initiates uplink transmission in the GP resources of the special subframe.

Figure 3:
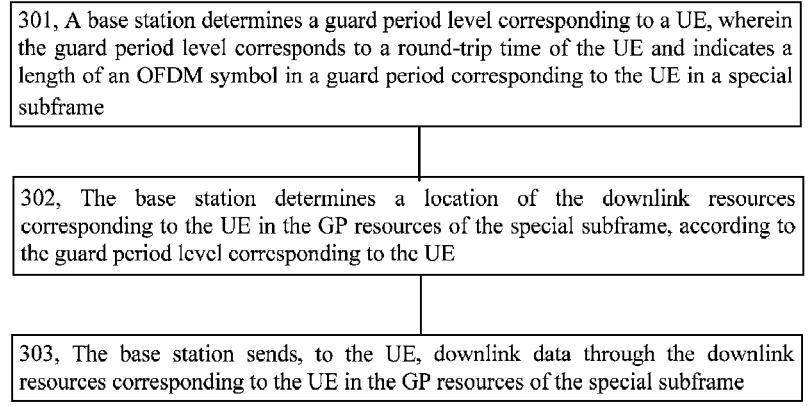
FIG. 3 is a flow chart of a method for transmitting data according to an embodiment of the present disclosure.

In such a scenario that the GP resources in the special subframe are used for transmitting downlink data, as shown in FIG. 3, an embodiment of the present disclosure provides a method for transmitting data, based on a base station, including:

301, A base station determines a guard period level corresponding to a UE, wherein the guard period level corresponds to a round-trip time of the UE and indicates a length of an OFDM symbol in a guard period corresponding to the UE in a special subframe.

The UE is located in a cell served by the base station. Because there are a plurality of UEs in the cell served by the base station, and different UEs have different distances from the base station in the physical position, i.e., different RTTs, and therefore, when different UEs and the base station transmit data through a special subframe, the needed time intervals between the downlink transmission and the uplink transmission, i.e., the guard periods can be different from each other. However, fixed GP resources are set in the frame structure of the cell, that is, the time length of the GP resources is constant, and therefore, in the embodiment of the present disclosure, the GP resources in the special subframe can be used to send downlink data, which is equivalent to adjusting the time interval between the downlink transmission and the uplink transmission of the UE.

In the embodiment of the present disclosure, the guard period level of the UE is classified according to a round-trip time of each UE within a cell, so that different UEs can use guard periods with different lengths depending on different round-trip times.

Taking an LTE TDD system as an example, provided that a maximum coverage radius of a cell supported by the system is 107 km, and the length of the GP resources set in the frame structure of the cell is 10 OFDM symbols, the guard period level can be classified into five levels, i.e., level 1 to level 5, by taking two OMDM symbol lengths as a granularity, wherein level 1 corresponds to a guard period length of 2 OFDM symbols, level 2 corresponds to a guard period length of 4 OFDM symbols, and by such analogy. Different UEs in the cell correspond to the same or different guard period levels depending on different round-trip times thereof, for example, if the round-trip time of the UE1 is less than 2 OFDM symbols, the guard period level of the UE1 is level 1, and the guard period length is 2 OFDM symbols; and if the round-trip time of the UE2 is 3 OFDM symbols, the guard period level of the UE2 is level 2, and the guard period length is 4 OFDM symbols.

When data transmission between the UE1 and the base station is performed through the special subframe, according to the guard period level of the UE1, the latter 2 OFDM symbols in GP resources will act as the guard period between the downlink data transmission and the uplink data transmission of the UE1, and the rest GP resources are used to send downlink data; likewise, in terms of UE2, when data transmission between the UE2 and the base station is performed through the special subframe, according to the guard period level of the UE2, the latter 4 OFDM symbols in GP resources will act as the guard period between the downlink data transmission and the uplink data transmission of the UE2, and the rest GP resources are used to send downlink data.

In this step, optionally, the base station can acquire a round-trip time of the UE and determine the guard period level corresponding to the UE, according to the round-trip time of the UE; specifically, the base station can respectively acquire, according to an RTT in the previous data transmission, an RTT of the UE, and also can compute, according to a preamble sequence sent from the UE, an RTT of the UE, and also can compute, according to a broadcast timing message, an RTT of the UE, or can use other methods to acquire the RTT, and the present disclosure is not limited thereto.

The base station also can determine the guard period level of the UE, according to a preset value. For example, in terms of an immobile UE with a stationary location within a certain period, such as a smart meter (Smart Meter), and a feeder terminal unit FTU (Feeder Terminal Unit), the RTT during which it arrives at the base station has an incredibly small range of variation and can be considered to be constant, and therefore, the base station can preset a guard period level corresponding to each UE, or also can store in advance an RTT of each UE, so that the base station can determine, according to the stored RTT, the guard period level corresponding to the UE.

302, The base station determines a location of the downlink resources corresponding to the UE in the GP resources of the special subframe, according to the guard period level corresponding to the UE.

The base station determines the length of the guard period corresponding to the UE after determining the guard period level corresponding to the UE, and then determines the location of the downlink resources corresponding to the UE in the GP resources of the special subframe. By way of example, if the guard period level of the UE1 is level 1, and the length of the guard period is 2 OFDM symbols, the downlink resources corresponding to the UE1 in the GP resources of the special subframe include all the OFDM symbols before the latter 2 OFDM symbols in the GP resources.

Of course, it is well known that the location of resources includes a time location and a frequency location of resources, in this step, particularly, the base station determines the location of the downlink resources corresponding to the UE in the GP resources of the special subframe, according to the guard period level corresponding to the UE, the base station also determines the frequency location of the downlink resources corresponding to the UE in the GP resources of the special subframe, according to practical situations, such as a current frequency domain allocation state of the system or a preset value, in the embodiment of the present disclosure, the base station also notifies the UE of the frequency location of the downlink resources corresponding to the UE in the GP resources of the special subframe by way of broadcasting or scheduling, such as by scheduling through the PDCCH.

303, The base station sends, to the UE, downlink data through the downlink resources corresponding to the UE in the GP resources of the special subframe.

The downlink data sent from the base station to the UE can be a physical downlink shared channel (PDSCH) (Physical Downlink Shared Channel) message, of course also can be other messages, and the present disclosure is not limited thereto.

In the method for transmitting data provided by the embodiment of the present disclosure, the guard period level of the UE is classified, so that different UEs can use guard periods with different lengths depending on their different round-trip times, on one hand, waiting time of the uplink and downlink transmission of the UE adjacent to the base station is effectively reduced and transmission performance of the system is effectively improved; on the other hand, the base station can use GP resources to send downlink data, and therefore, available resources of the system are increased and the utilization rate of resources of the system is effectively improved.

In another embodiment of the present disclosure, the method for transmitting data of the present embodiment also includes the following contents:

The base station sends to the UE a notification regarding the guard period level of the UE. For example, after the RRC is established, the base station sends to the UE indicator bit of guard period level corresponding to the UE, so that the UE determines its corresponding guard period level, and performs frequency domain scheduling through the PDCCH.

In another embodiment of the present disclosure, the method for transmitting data of the present embodiment also includes the following contents:

The base station sends to the UE a notification regarding a classifying manner of the guard period level, so that the UE can determine the guard period level corresponding to the UE, according to the classifying manner of the guard period level. In particular, the base station can notify the UE of the classifying manner of the guard period level through a system message.

Figure 4:
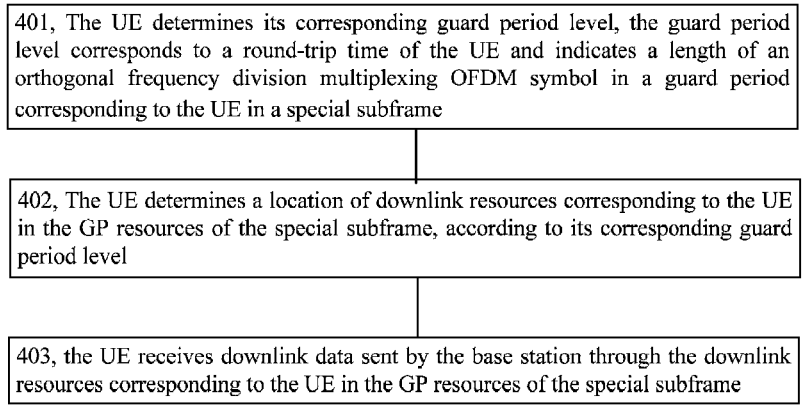
FIG. 4 is a flow chart of a method for transmitting data according to an embodiment of the present disclosure.

Corresponding to the method shown in FIG. 3, in such a scenario that the GP resources in the special subframe are used for transmitting downlink data, as shown in FIG. 4, an embodiment of the present disclosure also provides a method for transmitting data, based on a UE, including:

401, The UE determines its corresponding guard period level, the guard period level corresponds to a round-trip time of the UE and indicates a length of an orthogonal frequency division multiplexing (OFDM) symbol in a guard period corresponding to the UE in a special subframe.

Optionally, the guard period level corresponding to the UE can be notified by the base station to the UE, or can be determined by the UE itself by computation.

In particular, the base station can determine the guard period level corresponding to the UE, according to the RTT of the UE and the classifying manner of the guard period level determined by a preset valueor practical situations, such as system delay requirements, and then send to the UE a notification regarding the guard period level of the UE by way of broadcasting or scheduling, the UE receives the notification regarding the guard period level of the UE sent from the base station, and determines the guard period level corresponding to the UE according to the notification;

The base station also can directly notify the UE of the classifying manner of the guard period level, the UE receives a notification regarding the classifying manner of the guard period level sent from the base station and determines by itself the guard period level corresponding to the UE, according to the classifying manner of the guard period level and the round-trip time of itself;

wherein, the classifying manner of the guard period level can include such as the length of GP resources in the cell and the granularity of the guard period level, i.e., a difference of the OFDM symbol lengths corresponding to adjacent guard period levels. The UE can determine the guard period level corresponding to the UE according to the classifying manner of the guard period level, i.e., determine the length of the OFDM symbol in the guard period corresponding to the UE.

In addition, the UE also can determine its corresponding GP level according to a preset value. For example, in terms of an immobile UE with a stationary location within a certain period, such as a smart meter (Smart Meter), and a feeder terminal unit FTU (Feeder Terminal Unit), the RTT during which it arrives at the base station has an incredibly small range of variation and can be considered to be constant, and therefore, a guard period level corresponding to each UE can be preset, or an RTT of each UE also can be stored in advance, so that each UE can determine, according to the stored RTT, the respective guard period level corresponding to each UE.

402, The UE determines a location of downlink resources corresponding to the UE in the GP resources of the special subframe, according to its corresponding guard period level.

The UE determines its corresponding guard period level, i.e., determines the length of its guard period, and then determines the location of the downlink resources corresponding to the UE in the GP resources of the special subframe. By way of example, if the guard period level of the UE1 is level 1, and the length of the guard period is 2 OFDM symbols, the downlink resources corresponding to the UE1 in the GP resources of the special subframe include all the OFDM symbols before the latter 2 OFDM symbols in the GP resources.

Of course, it can be understood that the location of resources includes a time location and a frequency location of resources, particularly, in this step, the UE determines the time position of the uplink resources corresponding to the UE in the GP resources of the special subframe, according to its corresponding guard period level, and the UE determines the frequency position of the uplink resources corresponding to the UE in the GP resources of the special subframe, by way of broadcasting or scheduling of the base station, such as the PDCCH message issued by the base station. In addition, the UE also can determine a frequency position of the uplink resources corresponding to the UE in the GP resources of the special subframe, according to a preset value.

403, the UE receives downlink data sent from the base station through the downlink resources corresponding to the UE in the GP resources of the special subframe.

The downlink data sent from the base station can be a physical downlink shared channel (PDSCH) message, of course also can be other messages, and the present disclosure is not limited thereto.

In the method for transmitting data provided by the embodiment of the present disclosure, the guard period level of the UE is classified, so that different UEs can use guard periods with different lengths depending on their different round-trip times, on one hand, waiting time of the uplink and downlink transmission of the UE adjacent to the base station is effectively reduced and transmission performance of the system is effectively improved; on the other hand, the base station can use GP resources to send downlink data, and therefore, available resources of the system are increased and the utilization rate of resources of the system is effectively improved.

Figure 5:
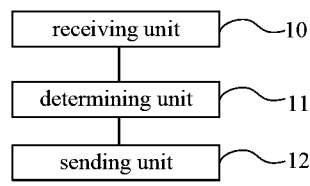
FIG. 5 is a structural block diagram of a UE according to an embodiment of the present disclosure.

Correspondingly to the method above, an embodiment of the present disclosure also provides a UE, used in a scenario that guard period resources in a special subframe are used for transmitting uplink data, as shown in FIG. 5, the UE includes a receiving unit 10, a determining unit 11, and a sending unit 12.

The receiving unit 10 is configured to receive downlink data sent from a base station through downlink resources of the special subframe.

The determining unit 11 is configured to determine a guard period level corresponding to the UE and determine a position of the uplink resources corresponding to the UE in the GP resources of the special subframe, according to the guard period level corresponding to the UE; wherein the guard period level corresponds to a round-trip time of the UE and indicates a length of an orthogonal frequency division multiplexing (OFDM) symbol in a guard period corresponding to the UE in the special subframe.

The sending unit 12 is configured to send uplink data to the base station through the uplink resources corresponding to the UE in the GP resources of the special subframe.

For the UE provided by the embodiment of the present disclosure, the guard period level is classified, so that different UEs can use guard periods with different lengths depending on their different round-trip times, on one hand, waiting time of the uplink and downlink data transmission of the UE adjacent to the base station is effectively reduced and transmission performance of the system is effectively improved; on the other hand, the UE can use GP resources to send uplink data, and therefore, available resources of the system are increased and the utilization rate of resources of the system is effectively improved.

The determining unit 11 can specifically be configured to receive the notification regarding the guard period level corresponding to the UE sent from the base station, and determine the guard period level corresponding to the UE according to the notification; or receive a notification regarding a classifying manner of the guard period level sent from the base station and determine the guard period level corresponding to the UE, according to the classifying manner of the guard period level and the round-trip time of the UE; or determine the guard period level corresponding to the UE according to a preset value.

Further, the uplink data sent from the sending unit 10 can include at least one of the following messages:

PRACH, PUSCH, PUCCH and SRS.

Figure 6:
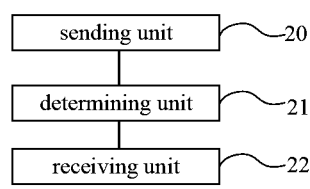
FIG. 6 is a structural block diagram of a base station according to an embodiment of the present disclosure.

Correspondingly to the method above, an embodiment of the present disclosure also provides a base station, used in a scenario that GP resources in a special subframe are used for transmitting uplink data, as shown in FIG. 6, the base station includes a sending unit 20, a determining unit 21, and a receiving unit 22.

The sending unit 20 is configured to send, to a UE, downlink data through downlink resources of a special subframe.

The determining unit 21 is configured to determine a guard period level corresponding to the UE and determine a position of uplink resources corresponding to the UE in the GP resources of the special subframe, according to the guard period level corresponding to the UE, wherein the guard period level corresponds to a round-trip time of the UE and indicates a length of an OFDM symbol in a guard period corresponding to the UE in the special subframe.

The receiving unit 22 is configured to receive uplink data sent from the UE through the uplink resources corresponding to the UE in the GP resources of the special subframe.

For the base station provided by the embodiment of the present disclosure, the guard period level is classified to the UE, so that different UEs can use guard periods with different lengths depending on their different round-trip times, on one hand, waiting time of the uplink and downlink data transmission of the UE adjacent to the base station is effectively reduced and transmission performance of the system is effectively improved; on the other hand, the UE can use GP resources to send uplink data, and therefore, available resources of the system are increased and the utilization rate of resources of the system is effectively improved.

The determining unit 21 is specifically configured to acquire the round-trip time of the UE and determine the guard period level corresponding to the UE, according to the round-trip time of the UE; or determine the guard period level of the UE, according to a preset value.

Further, in an embodiment of the present disclosure, the sending unit 20 is further configured to send to the UE a notification regarding the guard period level of the UE.

Further, in another embodiment of the present disclosure, the sending unit 20 is further configured to send to the UE a notification regarding a classifying manner of the guard period level.

In particular, the uplink data received by the receiving unit 22 and sent from the UE include at least one of the following messages:

PRACH, PUSCH, PUCCH and SRS.

Figure 7:
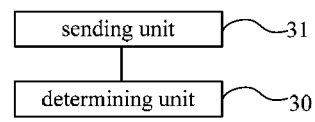
FIG. 7 is a structural block diagram of a base station according to an embodiment of the present disclosure.

Correspondingly to the method above, an embodiment of the present disclosure also provides a base station, used in a scenario that GP resources in a special subframe are used for transmitting downlink data, as shown in FIG. 7, the base station includes a determining unit 30 and a sending unit 31.

The determining unit 30 is configured to determine a guard period level corresponding to a UE and determine a location of downlink resources corresponding to the UE in the GP resources of the special subframe, according to the guard period level corresponding to the UE, wherein the guard period level corresponds to a round-trip time of the UE and indicates a length of an OFDM symbol in a guard period corresponding to the UE in the special subframe.

The sending unit 31 is configured to send, to the UE, downlink data through the downlink resources corresponding to the UE in the GP resources of the special subframe.

For the base station provided by the embodiment of the present disclosure, the guard period level is classified to the UE, so that different UEs can use guard periods with different lengths depending on their different round-trip times, on one hand, waiting time of the uplink and downlink data transmission of the UE adjacent to the base station is effectively reduced and transmission performance of the system is effectively improved; on the other hand, the base station can use GP resources to send downlink data, and therefore, available resources of the system are increased and the utilization rate of resources of the system is effectively improved.

The determining unit 30 is specifically configured to:

acquire the round-trip time of the UE and determine the guard period level corresponding to the UE, according to the round-trip time of the UE; or determine the guard period level of the UE, according to a preset value.

Further, in an embodiment of the present disclosure, the sending unit 31 is further configured to send to the UE a notification regarding the guard period level of the UE.

Further, in another embodiment of the present disclosure, the sending unit 31 is further configured to send to the UE a notification regarding a classifying manner of the guard period level.

In particular, the downlink data sent from the sending unit 31 to the UE can include a PDSCH message.

Figure 8:
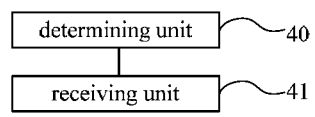
FIG. 8 is a structural block diagram of a UE according to an embodiment of the present disclosure.

Correspondingly to the method above, an embodiment of the present disclosure also provides a UE, used in a scenario that GP resources in a special subframe are used for transmitting downlink data, as shown in FIG. 8, the UE includes a determining unit 40 and a receiving unit 41.

The determining unit 40 is configured to determine its corresponding guard period level and determine a location of the downlink resources corresponding to the UE in the GP resources of the special subframe, according to its corresponding guard period level, wherein the guard period level corresponds to a round-trip time of the UE and indicates a length of an orthogonal frequency division multiplexing (OFDM) symbol in a guard period corresponding to the UE in the special subframe.

The receiving unit 41 is configured to receive downlink data, sent from the base station through the downlink resources corresponding to the UE in the GP resources of the special subframe.

The determining unit 40 is specifically configured to receive a notification regarding the guard period level of the UE sent from the base station, and determine the guard period level corresponding to the UE according to the notification; or receive a notification regarding a classifying manner of the guard period level sent from the base station and determine the guard period level corresponding to the UE, according to the classifying manner of the guard period level and the round-trip time of the UE; or determine the guard period level corresponding to the UE according to a preset value.

In particular, the downlink data received by the receiving unit 41 and sent from the base station can include a PDSCH message.

Another embodiment of the present disclosure also discloses a communication system, including the UE and the base station described above.

It should be noted that, although embodiments of the present disclosure take an LTE TDD wireless communication system as an example, but the present disclosure is not limited thereto, embodiments of the present disclosure are also applicable to a TDD system, such as WiMAX, TD-SCDMA. Furthermore, when embodiments of the present disclosure are applicable to other wireless communication system, name of guard period GP interval resources for the uplink transmission and the downlink transmission in the embodiments of the present disclosure may be changed, for example, it can be called as a round-trip time guard period, the present disclosure is not limited to the name of GP resources, and they shall also fall in the scope of the present disclosure.

Persons skilled in the art can clearly know that, for convenience and brevity of description, the detailed working procedures of the systems, devices, and units described above can refer to the corresponding procedures in the method embodiments, and are not repeated herein.

Understandably, in the embodiments described herein, the disclosed systems, devices and methods may be implemented in other modes. For example, the device embodiments above are illustrative in nature, and the units of the device are defined from the perspective of logical functions only and may be defined in a different way in practical application. For example, multiple units or components may be combined or integrated into another system, or some features may be ignored or not executed. Besides, the coupling, direct coupling or communication connection illustrated or discussed herein may be implemented through indirect coupling or communication connection between interfaces, devices or units, and may be electronic, mechanical, or in other forms.

The units described as stand-alone components above may be separated physically or not; and the components illustrated as units may be physical units or not, namely, they may be located in one place, or distributed on multiple network elements. Some or all of the units described above may be selected as required to fulfill the objectives of the technical solutions of the present disclosure.

Besides, all functional units in the embodiments of the present disclosure may be physically stand-alone, or integrated into a processing module, or two or more of the units are integrated into one unit. The integrated unit may be implemented in a manner of a hardware or a software function unit.

If being implemented as a software function unit and sold or used as a stand-alone product, the integrated unit may be stored in a computer-readable storage medium. Therefore, the essence of the technical solutions of the present disclosure, or its contribution to the prior art, or all or part of the technical solution, may be embodied in a software product. The computer software product may be stored in a storage medium and incorporate several instructions for instructing a computer device (for example, personal computer, server, or network device) to execute all or part of the steps of the method specified in any embodiment of the present disclosure. Examples of the storage medium include various media capable of storing program codes, such as a USB flash disk, a mobile hard disk, a read-only memory (ROM, Read-Only Memory), a random access memory (RAM, Random Access Memory), a magnetic disk, or an optical disk.

Finally, it should be noted that the above embodiments are merely provided for describing the technical solutions of the present disclosure, but not intended to limit the present disclosure. It should be understood by persons skilled in the art that although the present disclosure has been described in detail with reference to the foregoing embodiments, modifications can be made to the technical solutions described in the foregoing embodiments, or equivalent replacements can be made to some technical features in the technical solutions; however, such modifications or replacements do not cause the essence of corresponding technical solutions to depart from scope of the embodiments of the present disclosure.

What is claimed is:

1. A method for transmitting data, comprising:
   receiving, by a user equipment, downlink data sent from a base station through downlink resources of a subframe;
   determining, by the user equipment, a guard period level corresponding to the user equipment, wherein the guard period level corresponds to a round-trip time of the user equipment and indicates a length of an orthogonal frequency division multiplexing (OFDM) symbol in a guard period corresponding to the user equipment in the subframe;
   determining, by the user equipment, according to the guard period level corresponding to the user equipment, a position of uplink resources corresponding to the user equipment in guard period resources of the subframe; and
   sending, by the user equipment, uplink data to the base station through the uplink resources corresponding to the user equipment in the guard period resources of the subframe.

2. The method for transmitting data according to claim 1, further comprising one of the following steps:
   Step A1: receiving, by the user equipment, a notification regarding the guard period level corresponding to the user equipment, sent from the base station, and determining, by the user equipment, the guard period level corresponding to the user equipment, according to the notification;
   Step A2: receiving, by the user equipment, a notification regarding a classifying manner of the guard period level, sent from the base station, and determining, by the user equipment, the guard period level corresponding to the user equipment, according to the classifying manner of the guard period level and the round-trip time of the user equipment; and
   Step A3: determining, by the user equipment, the guard period level corresponding to the user equipment, according to a preset value.

3. The method for transmitting data according to claim 1, wherein the uplink data sent from the user equipment comprise at least one of the following messages:
   a physical random access channel (PRACH), a physical uplink shared channel (PUSCH), a physical uplink control channel (PUCCH) and a sounding reference signal (SRS).

4. A method for transmitting data, comprising:
   sending, by a base station, downlink data through downlink resources of a subframe to a user equipment;
   determining, by the base station, a guard period level corresponding to the user equipment, wherein the guard period level corresponds to a round-trip time of the user equipment and indicates a length of an orthogonal frequency division multiplexing (OFDM) symbol in a guard period corresponding to the user equipment in the subframe;
   determining, by the base station, a position of uplink resources corresponding to the user equipment in guard period resources of the subframe, according to the guard period level corresponding to the user equipment; and
   receiving, by the base station, uplink data sent from the user equipment through the uplink resources corresponding to the user equipment in the guard period resources of the subframe.

5. The method for transmitting data according to claim 4, further comprising one of the following steps:
   Step B1: acquiring, by the base station, the round-trip time of the user equipment, and determining, by the base station, the guard period level corresponding to the user equipment, according to the round-trip time of the user equipment; and
   Step B2: determining, by the base station, the guard period level of the user equipment, according to a preset value.

6. The method for transmitting data according to claim 4, further comprising:
   sending, by the base station, one of a notification regarding the guard period level of the user equipment and a notification regarding a classifying manner of the guard period level to the user equipment.

7. The method for transmitting data according to claim 4, wherein the uplink data received by the base station and sent from the user equipment comprise at least one of the following messages:
a physical random access channel (PRACH), a physical uplink shared channel (PUSCH), a physical uplink control channel (PUCCH) and a sounding reference signal (SRS).

8. A method for transmitting data, comprising:
determining, by a base station, a guard period level corresponding to a user equipment, wherein the guard period level corresponds to a round-trip time of the user equipment and indicates a length of an orthogonal frequency division multiplexing (OFDM) symbol in a guard period corresponding to the user equipment in a subframe;
determining, by the base station, a location of downlink resources corresponding to the user equipment in guard period resources of the subframe, according to the guard period level corresponding to the user equipment; and
sending, by the base station, downlink data through the downlink resources corresponding to the user equipment in the guard period resources of the subframe to the user equipment.

9. The method for transmitting data according to claim 8, further comprising one of the following steps:
Step C1: acquiring, by the base station, the round-trip time of the user equipment, and determining, by the base station, the guard period level corresponding to the user equipment, according to the round-trip time of the user equipment; and
Step C2: determining, by the base station, the guard period level of the user equipment, according to a preset value.

10. The method for transmitting data according to claim 8, further comprising:
sending, by the base station, one of a notification regarding the guard period level of the user equipment and a notification regarding a classifying manner of the guard period level to the user equipment.

11. The method for transmitting data according to claim 8, wherein the downlink data sent from the base station to the user equipment comprise a physical downlink shared channel (PDSCH) message.

12. A method for transmitting data, comprising:
determining, by a user equipment, a guard period level corresponding to the user equipment, wherein the guard period level corresponds to a round-trip time of the user equipment and indicates a length of an orthogonal frequency division multiplexing (OFDM) symbol in a guard period corresponding to the user equipment in a subframe;
determining, by the user equipment, according to the guard period level corresponding to the user equipment, a location of downlink resources corresponding to the user equipment in guard period resources of the subframe; and
receiving, by the user equipment, downlink data sent from a base state to the user equipment through the downlink resources corresponding to the user equipment in the guard period resources of the subframe.

13. The method for transmitting data according to claim 12, further comprising one of the following steps:
Step D1: receiving, by the user equipment, a notification regarding the guard period level corresponding to the user equipment, sent from the base station, and determining, by the user equipment, the guard period level corresponding to the user equipment, according to the notification;
Step D2: receiving, by the user equipment, a notification regarding a classifying manner of the guard period level, sent from the base station, and determining, by the user equipment, the guard period level corresponding to the user equipment, according to the classifying manner of the guard period level and the round-trip time of the user equipment; and
Step D3: determining, by the user equipment, the guard period level corresponding to the user equipment, according to a preset value.

14. The method for transmitting data according to claim 12, wherein the downlink data, sent from the base station comprises a physical downlink shared channel (PDSCH) message.

15. A user equipment, comprising:
a receiver, configured to receive downlink data sent from a base station through downlink resources of a subframe;
a processor, configured to determine a guard period level corresponding to the user equipment and determine a position of uplink resources corresponding to the user equipment in guard period resources of the subframe, according to the guard period level corresponding to the user equipment, wherein the guard period level corresponds to a round-trip time of the user equipment and indicates a length of an orthogonal frequency division multiplexing (OFDM) symbol in a guard period corresponding to the user equipment in the subframe;
a transmitter, configured to send uplink data to the base station through the uplink resources corresponding to the user equipment in the guard period resources of the subframe.

16. The user equipment according to claim 15, wherein,
the receiver is further configured to receive a notification regarding the guard period level corresponding to the user equipment, sent from the base station; and
the processor is further configured to determine the guard period level corresponding to the user equipment, according to the notification.

17. The user equipment according to claim 15, wherein,
the receiver is further configured to receive a notification regarding a classifying manner of the guard period level, sent from the base station; and
the processor is further configured to determine the guard period level corresponding to the user equipment, according to the classifying manner of the guard period level and the round-trip time of the user equipment.

18. The user equipment according to claim 15, wherein,
the processor is further configured to determine the guard period level corresponding to the user equipment, according to a preset value.

19. The user equipment according to claim 15, wherein the uplink data sent from the sending unit comprise at least one of the following messages:
a physical random access channel (PRACH), a physical uplink shared channel (PUSCH), a physical uplink control channel (PUCCH) and a sounding reference signal (SRS).

20. A base station, comprising:
a transmitter, configured to send downlink data through downlink resources of a subframe to a user equipment;
a processor, configured to determine a guard period level corresponding to the user equipment and determine a position of uplink resources corresponding to the user equipment in guard period resources of the subframe, according to the guard period level corresponding to the user equipment, wherein the guard period level corresponds to a round-trip time of the user equipment and indicates a length of an orthogonal frequency division multiplexing (OFDM) symbol in a guard period corresponding to the user equipment in the subframe; and a receiver, configured to receive uplink data sent from the user equipment through the uplink resources corresponding to the user equipment in the guard period resources of the subframe.

21. The base station according to claim 20, wherein, the processor is further configured to implement one of the following steps:

Step E1: acquiring the round-trip time of the user equipment and determining the guard period level corresponding to the user equipment, according to the round-trip time of the user equipment; and Step E2: determining the guard period level of the user equipment according to a preset value.

22. The base station according to claim 20, wherein the transmitter is further configured to send one of a notification regarding the guard period level of the user equipment and a notification regarding a classifying manner of the guard period level to the user equipment.

23. The base station according to claim 20, wherein the uplink data comprise at least one of the following messages:

a physical random access channel (PRACH), a physical uplink shared channel (PUSCH), a physical uplink control channel (PUCCH) and a sounding reference signal (SRS).

24. A base station, comprising:

a processor, configured to determine a guard period level corresponding to a user equipment and determine a location of downlink resources corresponding to the user equipment in guard period resources of a subframe, according to the guard period level corresponding to the user equipment, wherein the guard period level corresponds to a round-trip time of the user equipment and indicates a length of an orthogonal frequency division multiplexing (OFDM) symbol in a guard period corresponding to the user equipment in the subframe; and a transmitter, configured to send downlink data through the downlink resources corresponding to the user equipment in the guard period resources of the subframe to the user equipment.

25. The base station according to claim 24, wherein, the processor is further configured to implement one of the following steps:

Step F1: acquiring the round-trip time of the user equipment and determining the guard period level corresponding to the user equipment, according to the round-trip time of the user equipment; and Step F2: determining the guard period level of the user equipment, according to a preset value.

26. The base station according to claim 24, wherein the transmitter is further configured to:

send one of a notification regarding the guard period level of the user equipment and a notification regarding a classifying manner of the guard period level to the user equipment.

27. The base station according to claim 24, wherein the downlink data comprise a physical downlink shared channel (PDSCH) message.

28. A user equipment, comprising:

a processor, configured to determine a guard period level corresponding to the user equipment and determine a location of downlink resources corresponding to the user equipment in guard period resources of a subframe, according to the guard period level corresponding to the user equipment, wherein the guard period level corresponds to a round-trip time of the user equipment and indicates a length of an orthogonal frequency division multiplexing (OFDM) symbol in a guard period corresponding to the user equipment in the subframe; and a receiver, configured to receive downlink data sent from a base station through the downlink resources corresponding to the user equipment in the guard period resources of the subframe.

29. The user equipment according to claim 28, wherein, the receiver is further configured to receive a notification regarding the guard period level corresponding to the user equipment sent from the base station; and the processor is further configured to determine the guard period level corresponding to the user equipment, according to the notification.

30. The user equipment according to claim 28, wherein, the receiver is further configured to receive a notification regarding a classifying manner of the guard period level sent from the base station; and the processor is further configured to determine the guard period level corresponding to the user equipment, according to the classifying manner of the guard period level and the round-trip time of the user equipment.

31. The user equipment according to claim 28, wherein, the processor is further configured to determine the guard period level corresponding to the user equipment, according to a preset value.

32. The user equipment according to claim 28, wherein the downlink data comprise a physical downlink shared channel (PDSCH) message.

* * * * *

UNITED STATES PATENT AND TRADEMARK OFFICE
CERTIFICATE OF CORRECTION

| | |
|---|---|
| PATENT NO. | : 9,155,084 B2 |
| APPLICATION NO. | : 14/080207 |
| DATED | : October 6, 2015 |
| INVENTOR(S) | : Wang et al. |

It is certified that error appears in the above-identified patent and that said Letters Patent is hereby corrected as shown below:

Title page

Page 2, (56) Foreign Patent Documents, column 2, the publication date for WO 2008088252 A1 should read -- 7/2008 --.

Signed and Sealed this
Twenty-fourth Day of May, 2016

Michelle K. Lee
*Director of the United States Patent and Trademark Office*